United States Patent
Kanou et al.

(10) Patent No.: US 9,319,647 B2
(45) Date of Patent: Apr. 19, 2016

(54) IMAGE PROCESSING DEVICE

(71) Applicant: HONDA MOTOR CO., LTD., Minato-ku, Tokyo (JP)

(72) Inventors: Tadahiko Kanou, Saitama (JP); Masahiko Adachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 56 days.

(21) Appl. No.: 14/364,902

(22) PCT Filed: Oct. 4, 2012

(86) PCT No.: PCT/JP2012/075800
§ 371 (c)(1),
(2) Date: Jun. 12, 2014

(87) PCT Pub. No.: WO2013/088821
PCT Pub. Date: Jun. 20, 2013

(65) Prior Publication Data
US 2014/0347530 A1    Nov. 27, 2014

(30) Foreign Application Priority Data

Dec. 16, 2011 (JP) .................................. 2011-276496
Dec. 16, 2011 (JP) .................................. 2011-276497

(51) Int. Cl.
*H04N 5/202* (2006.01)
*H04N 9/07* (2006.01)
(Continued)

(52) U.S. Cl.
CPC ........ *H04N 9/07* (2013.01); *G06T 7/408* (2013.01); *H04N 9/045* (2013.01)

(58) Field of Classification Search
CPC .......... H04N 9/07; H04N 9/045; H04N 1/407; H04N 1/4078; G06T 7/408
USPC .............................. 348/254, 255, 276, 222.1
See application file for complete search history.

(56) References Cited

U.S. PATENT DOCUMENTS

2001/0024237 A1 *  9/2001  Osada .................... H04N 5/232
                                                      348/273
2005/0248667 A1 * 11/2005  Schweng ............. H04N 5/2355
                                                      348/234

(Continued)

FOREIGN PATENT DOCUMENTS

CN    101467444 A    6/2009
JP    2004-229324 A  8/2004

(Continued)

OTHER PUBLICATIONS

European Search Report dated Jun. 23, 2015 in regards to European Patent Application No. EP 12 85 7623.

(Continued)

*Primary Examiner* — Sinh Tran
*Assistant Examiner* — Zhenzhen Wu
(74) *Attorney, Agent, or Firm* — Carrier Blackman & Associates, P.C.; Joseph P. Carrier; Jeffrey T. Gedeon

(57) ABSTRACT

In an original image color pixels and transparent pixels are arranged, the color pixels having gradation values assigned according to received light levels of respective color light-receiving pixels and the transparent pixels having gradation values assigned according to received light levels of respective transparent light-receiving pixels. An image processing device includes an image generation unit which generates a high-sensitivity image for the original image by calculating for each color pixel, a corrected gradation value correcting a first reference gradation value of gray calculated based on the gradation value of itself or the gradation values of other color pixels in the periphery, according to the gradation values of transparent pixels in the periphery; and the corrected gradation value of each color pixel and the gradation value of each transparent pixel are assigned as gradation values of the pixels in the corresponding arranged positions of the high-sensitivity image.

9 Claims, 6 Drawing Sheets

(51) Int. Cl.
*H04N 9/04* (2006.01)
*G06T 7/40* (2006.01)

(56) References Cited

U.S. PATENT DOCUMENTS

| | | | |
|---|---|---|---|
| 2006/0017829 A1 | 1/2006 | Gallagher | |
| 2008/0187235 A1* | 8/2008 | Wakazono | H04N 5/243 382/255 |
| 2008/0218597 A1* | 9/2008 | Cho | H04N 5/2351 348/222.1 |
| 2010/0157091 A1 | 6/2010 | Honda et al. | |
| 2012/0274798 A1* | 11/2012 | Takahashi | H04N 9/735 348/222.1 |
| 2015/0029358 A1* | 1/2015 | Kaizu | H04N 9/07 348/223.1 |

FOREIGN PATENT DOCUMENTS

| | | |
|---|---|---|
| JP | 2007-048774 A | 2/2007 |
| JP | 2007-274632 A | 10/2007 |
| JP | 2008-507908 A | 3/2008 |

OTHER PUBLICATIONS

Hertel et al., "Utilizing Near-Infrared and Colour Information in an Automotive Wide-Dynamic-Range Night Vision System for Driver Assistance," Hertel et al. From Advanced Microsystems for Automotive Applications 2010—Smart Systems for Green Cars and Safe Mobility, May 10, 2010, pp. 145-154, XP008176658, International Forum on Advanced Microsystems for Automotive Applications (AMAA), Berlin, Germany.

Office Action dated Sep. 1, 2015 corresponding to Chinese Patent Application No. 201280060850.X.

* cited by examiner

FIG.2A

| j=1 | 2 | 3 | 4 | 5 | 6 | ... | n |
|---|---|---|---|---|---|---|---|
| i=1 $R_{11}$ | $G_{12}$ | $B_{13}$ | $G_{14}$ | $R_{15}$ | $G_{16}$ | ... | $F_{1n}$ |
| 2 $G_{21}$ | $W_{22}$ | $G_{23}$ | $W_{24}$ | $G_{25}$ | $W_{26}$ | ... | $F_{2n}$ |
| 3 $B_{31}$ | $G_{32}$ | $R_{33}$ | $G_{34}$ | $B_{35}$ | $G_{36}$ | ... | $F_{3n}$ |
| 4 $G_{41}$ | $W_{42}$ | $G_{43}$ | $W_{44}$ | $G_{45}$ | $W_{46}$ | ... | $F_{4n}$ |
| 5 $R_{51}$ | $G_{52}$ | $B_{53}$ | $G_{54}$ | $R_{55}$ | $G_{56}$ | ... | $F_{5n}$ |
| 6 $G_{61}$ | $W_{62}$ | $G_{63}$ | $W_{64}$ | $G_{65}$ | $W_{66}$ | ... | $F_{6n}$ |
| ⋮ | ⋮ | ⋮ | ⋮ | ⋮ | | | ⋮ |
| m $F_{m1}$ | $F_{m2}$ | $F_{m3}$ | $F_{m4}$ | $F_{m5}$ | $F_{m6}$ | ... | $F_{mn}$ |

F IS ONE OF R, G, B, AND W.

FIG.2B

| j=1 | 2 | 3 | 4 | 5 | 6 | ... | n |
|---|---|---|---|---|---|---|---|
| i=1 $Sr_{11}$ | $Sg_{12}$ | $Sb_{13}$ | $Sg_{14}$ | $Sr_{15}$ | $Sg_{16}$ | ... | $Sf_{1n}$ |
| 2 $Sg_{21}$ | $Sw_{22}$ | $Sg_{23}$ | $Sw_{24}$ | $Sg_{25}$ | $Sw_{26}$ | ... | $Sf_{2n}$ |
| 3 $Sb_{31}$ | $Sg_{32}$ | $Sr_{33}$ | $Sg_{34}$ | $Sb_{35}$ | $Sg_{36}$ | ... | $Sf_{3n}$ |
| 4 $Sg_{41}$ | $Sw_{42}$ | $Sg_{43}$ | $Sw_{44}$ | $Sg_{45}$ | $Sw_{46}$ | ... | $Sf_{4n}$ |
| 5 $Sr_{51}$ | $Sg_{52}$ | $Sb_{53}$ | $Sg_{54}$ | $Sr_{55}$ | $Sg_{56}$ | ... | $Sf_{5n}$ |
| 6 $Sg_{61}$ | $Sw_{62}$ | $Sg_{63}$ | $Sw_{64}$ | $Sg_{65}$ | $Sw_{66}$ | ... | $Sf_{6n}$ |
| ⋮ | ⋮ | ⋮ | ⋮ | ⋮ | | | ⋮ |
| m $Sf_{m1}$ | $Sf_{m2}$ | $Sf_{m3}$ | $Sf_{m4}$ | $Sf_{m5}$ | $Sf_{m6}$ | ... | $Sf_{mn}$ | f IS ONE OF r, g, b, AND w.

FIG.4A

| | j=1 | 2 | 3 | 4 | 5 | 6 | ............ | n |
|---|---|---|---|---|---|---|---|---|
| i=1 | $C_{11}$ | $C_{12}$ | $C_{13}$ | $C_{14}$ | $C_{15}$ | $C_{16}$ | ............ | $C_{1n}$ |
| 2 | $C_{21}$ | $C_{22}$ | $C_{23}$ | $C_{24}$ | $C_{25}$ | $C_{26}$ | ............ | $C_{2n}$ |
| 3 | $C_{31}$ | $C_{32}$ | $C_{33}$ | $C_{34}$ | $C_{35}$ | $C_{36}$ | ............ | $C_{3n}$ |
| 4 | $C_{41}$ | $C_{42}$ | $C_{43}$ | $C_{44}$ | $C_{45}$ | $C_{46}$ | ............ | $C_{4n}$ |
| 5 | $C_{51}$ | $C_{52}$ | $C_{53}$ | $C_{54}$ | $C_{55}$ | $C_{56}$ | ............ | $C_{5n}$ |
| 6 | $C_{61}$ | $C_{62}$ | $C_{63}$ | $C_{64}$ | $C_{65}$ | $C_{66}$ | ............ | $C_{6n}$ |
| ⋮ | ⋮ | ⋮ | ⋮ | ⋮ | ⋮ | | | ⋮ |
| m | $C_{m1}$ | $C_{m2}$ | $C_{m3}$ | $C_{m4}$ | $C_{m5}$ | $C_{m6}$ | ............ | $C_{mn}$ |

| | j=1 | 2 | 3 | 4 | 5 | 6 | ............ | n |
|---|---|---|---|---|---|---|---|---|
| i=1 | $H_{11}$ | $H_{12}$ | $H_{13}$ | $H_{14}$ | $H_{15}$ | $H_{16}$ | ............ | $H_{1n}$ |
| 2 | $H_{21}$ | $H_{22}$ | $H_{23}$ | $H_{24}$ | $H_{25}$ | $H_{26}$ | ............ | $H_{2n}$ |
| 3 | $H_{31}$ | $H_{32}$ | $H_{33}$ | $H_{34}$ | $H_{35}$ | $H_{36}$ | ............ | $H_{3n}$ |
| 4 | $H_{41}$ | $H_{42}$ | $H_{43}$ | $H_{44}$ | $H_{45}$ | $H_{46}$ | ............ | $H_{4n}$ |
| 5 | $H_{51}$ | $H_{52}$ | $H_{53}$ | $H_{54}$ | $H_{55}$ | $H_{56}$ | ............ | $H_{5n}$ |
| 6 | $H_{61}$ | $H_{62}$ | $H_{63}$ | $H_{64}$ | $H_{65}$ | $H_{66}$ | ............ | $H_{6n}$ |
| ⋮ | ⋮ | ⋮ | ⋮ | ⋮ | ⋮ | | | ⋮ |
| m | $H_{m1}$ | $H_{m2}$ | $H_{m3}$ | $H_{m4}$ | $H_{m5}$ | $H_{m6}$ | ............ | $H_{mn}$ |

| | j=1 | 2 | 3 | 4 | 5 | 6 | ............. | n |
|---|---|---|---|---|---|---|---|---|
| i=1 | $D_{11}$ | $D_{12}$ | $D_{13}$ | $D_{14}$ | $D_{15}$ | $D_{16}$ | ............. | $D_{1n}$ |
| 2 | $D_{21}$ | $D_{22}$ | $D_{23}$ | $D_{24}$ | $D_{25}$ | $D_{26}$ | ............. | $D_{2n}$ |
| 3 | $D_{31}$ | $D_{32}$ | $D_{33}$ | $D_{34}$ | $D_{35}$ | $D_{36}$ | ............. | $D_{3n}$ |
| 4 | $D_{41}$ | $D_{42}$ | $D_{43}$ | $D_{44}$ | $D_{45}$ | $D_{46}$ | ............. | $D_{4n}$ |
| 5 | $D_{51}$ | $D_{52}$ | $D_{53}$ | $D_{54}$ | $D_{55}$ | $D_{56}$ | ............. | $D_{5n}$ |
| 6 | $D_{61}$ | $D_{62}$ | $D_{63}$ | $D_{64}$ | $D_{65}$ | $D_{66}$ | ............. | $D_{6n}$ |
| ⋮ | ⋮ | ⋮ | ⋮ | ⋮ | ⋮ | ⋮ | | ⋮ |
| m | $D_{m1}$ | $D_{m2}$ | $D_{m3}$ | $D_{m4}$ | $D_{m5}$ | $D_{m6}$ | ............. | $D_{mn}$ |

| i\j | 1 | 2 | 3 | 4 | 5 | 6 | ... | n |
|---|---|---|---|---|---|---|---|---|
| i=1 | $R_{11}$ | $W_{12}$ | $B_{13}$ | $W_{14}$ | $R_{15}$ | $W_{16}$ | ... | $F_{1n}$ |
| 2 | $W_{21}$ | $G_{22}$ | $W_{23}$ | $G_{24}$ | $W_{25}$ | $G_{26}$ | ... | $F_{2n}$ |
| 3 | $B_{31}$ | $W_{32}$ | $R_{33}$ | $W_{34}$ | $B_{35}$ | $W_{36}$ | ... | $F_{3n}$ |
| 4 | $W_{41}$ | $G_{42}$ | $W_{43}$ | $G_{44}$ | $W_{45}$ | $G_{46}$ | ... | $F_{4n}$ |
| 5 | $R_{51}$ | $W_{52}$ | $B_{53}$ | $W_{54}$ | $R_{55}$ | $W_{56}$ | ... | $F_{5n}$ |
| 6 | $W_{61}$ | $G_{62}$ | $W_{63}$ | $G_{64}$ | $W_{65}$ | $G_{66}$ | ... | $F_{6n}$ |
| ⋮ | ⋮ | ⋮ | ⋮ | ⋮ | ⋮ | ⋮ | ⋱ | ⋮ |
| m | $F_{m1}$ | $F_{m2}$ | $F_{m3}$ | $F_{m4}$ | $F_{m5}$ | $F_{m6}$ | ... | $F_{mn}$ |

21-1
22

F IS ONE OF R, G, B, AND W.

FIG.6B

| i\j | 1 | 2 | 3 | 4 | 5 | 6 | ... | n |
|---|---|---|---|---|---|---|---|---|
| i=1 | $Sr_{11}$ | $Sw_{12}$ | $Sb_{13}$ | $Sw_{14}$ | $Sr_{15}$ | $Sw_{16}$ | ... | $Sf_{1n}$ |
| 2 | $Sw_{21}$ | $Sg_{22}$ | $Sw_{23}$ | $Sg_{24}$ | $Sw_{25}$ | $Sg_{26}$ | ... | $Sf_{2n}$ |
| 3 | $Sb_{31}$ | $Sw_{32}$ | $Sr_{33}$ | $Sw_{34}$ | $Sb_{35}$ | $Sw_{36}$ | ... | $Sf_{3n}$ |
| 4 | $Sw_{41}$ | $Sg_{42}$ | $Sw_{43}$ | $Sg_{44}$ | $Sw_{45}$ | $Sg_{46}$ | ... | $Sf_{4n}$ |
| 5 | $Sr_{51}$ | $Sw_{52}$ | $Sb_{53}$ | $Sw_{54}$ | $Sr_{55}$ | $Sw_{56}$ | ... | $Sf_{5n}$ |
| 6 | $Sw_{61}$ | $Sg_{62}$ | $Sw_{63}$ | $Sg_{64}$ | $Sw_{65}$ | $Sg_{66}$ | ... | $Sf_{6n}$ |
| ⋮ | ⋮ | ⋮ | ⋮ | ⋮ | ⋮ | ⋮ | ⋱ | ⋮ |
| m | $Sf_{m1}$ | $Sf_{m2}$ | $Sf_{m3}$ | $Sf_{m4}$ | $Sf_{m5}$ | $Sf_{m6}$ | ... | $Sf_{mn}$ |

41-1 f IS ONE OF r, g, b, AND w.

IMAGE PROCESSING DEVICE

TECHNICAL FIELD

The present invention relates to an image processing device which processes imaging data acquired by an image pickup device including, an arrangement of pixels for receiving light through a color filter and pixels for receiving light without using a color filter.

BACKGROUND ART

Conventionally, there has been proposed a method of improving the sensitivity of a color image by using an image pickup device including an arrangement of pixels for receiving light through a color filter (color light-receiving pixels) and pixels for receiving light without using a color filter (transparent light-receiving pixels) (refer to for example, Patent Document 1).

PRIOR ART DOCUMENT

Patent Document

Patent Document 1: Published Japanese translation of PCT International Publication for Patent Application No. 2008-507908

SUMMARY OF THE INVENTION

Problems to be Solved by the Invention

Characteristics required for an image taken by a camera depend on the use of a taken image. For example, in the case of detecting an object from the taken image, color image is needed when using color information of the object.

Moreover, in the case of detecting an object from the taken image sander the imaging condition of low illuminance like in the nighttime, a high-sensitivity image is needed. Furthermore, in order to detect image portions of a wide range of objects including dark to light objects, a wide dynamic range image is needed.

Then, it is also conceivable to mount a plurality of cameras in different specifications and to select a camera to be used out of the cameras according to the intended use in order to cope with different uses as described above. This, however, causes disadvantages such as a complicated device configuration and an increase in device cost.

Therefore, as in the method described in Patent Document 1, a color image with improved sensitivity is able to be acquired by using an image pickup device having transparent light-receiving pixels. Then, since the sensitivity is different between a pixel for receiving light through a color filter and a pixel for receiving light without using a color filter, it is also conceivable to change the storage time of received light between both pixels. This, however, causes a problem that the effect of increasing the sensitivity disappears. Moreover, in some cases, an image with a wide dynamic range is needed.

The present invention has been made in view of the above background. Therefore, it is an object of the present invention to provide an image processing device capable of generating an image with higher sensitivity or an image with a wide dynamic range from an image taken by a camera with an image pickup device including an arrangement of pixels for receiving light through a color filter and pixels for receiving light without using a color filter.

Means for Solving the Problems

The present invention has been made in order to achieve the above object. To generate an image with higher sensitivity or an image with a wide dynamic range, the present invention provides an image processing device, including:

a camera which takes an image using an image pickup device including an arrangement of a plurality of color light-receiving pixels which receive light through a color filter and a plurality of transparent light-receiving pixels which receive light without using a color filter; and an image generation unit which generates at least one of a high-sensitivity image and a wide dynamic range image based on a corrected gradation value of each of a plurality of color pixels, for an original image taken by the camera, the original image including an arrangement of the plurality of color pixels having gradation values individually assigned according to the received light levels of the respective color light-receiving pixels and a plurality of transparent pixels having gradation values individually assigned according to the received light levels of the respective transparent light-receiving pixels, by calculating, for each of the color pixels, the corrected gradation value in which a first reference gradation value of gray calculated based on the gradation value of itself or the gradation values of other color pixels arranged in the periphery is corrected according to the gradation values of transparent pixels arranged in the periphery, and by assigning the corrected gradation value of each color pixel and the gradation value of each transparent pixel as gradation values of pixels in the corresponding arranged positions of the high-sensitivity image (a first aspect of the invention).

According to the first aspect of the invention, the image generation unit obtains, for each color pixel of the original image, the gradation values of the respective color pixels having the same levels of sensitivity as the gradation values of the transparent pixels of the original image by calculating the corrected gradation value in which the first reference gradation value of gray calculated based on the gradation value of itself or the gradation values of other color pixels arranged in the periphery is corrected according to the gradation values of transparent pixels arranged in the periphery. Furthermore, the image generation unit is able to generate at least one of the high-sensitivity image and wide dynamic range image based on the corrected gradation value.

Moreover, in the first aspect of the invention, the image generation unit generates the high-sensitivity image by assigning the corrected gradation value of each of the plurality of color pixels and the gradation value of each of the plurality of transparent pixels as gradation values of pixels in a corresponding arranged positions of the high-sensitivity image (a second aspect of the invention).

According to the second aspect of the invention, the image generation unit is able to generate the high-sensitivity image by assigning its gradation value with respect the transparent pixels, and its corrected gradation value with respect the color pixels, as gradation values of pixels in the corresponding arranged positions of the high-sensitivity image.

Moreover, in the second aspect of the invention, the color filter is a three-primary-color filter and the color light-receiving pixel receives light through a filter of any one of the three primary colors;

the image generation unit calculates, for each transparent pixel of the original image, the gradation values of the three primary colors on the basis of the gradation values of the color pixels arranged in the periphery and calculates a gradation difference degree between a second reference gradation value of gray calculated from the gradation values of the three primary colors and the gradation value of itself;

the image generation unit calculates, for each color pixel of the original image, the gradation values of the three primary colors on the basis of the gradation value of itself or the gradation values of other color pixels arranged in the periphery and calculates the first reference gradation value from the gradation values of the three primary colors; and the image generation unit calculates the corrected gradation value by correcting the first reference gradation value on the basis of the gradation difference degree of the transparent pixels arranged in the periphery (a third aspect of the invention).

According to the third aspect of the invention, a high-sensitivity image, in which the gradation values of color pixels are corrected according to the gradation values of transparent pixels, is able to be generated from the original image taken by the camera which takes an image using the image pickup device provided with a general three-primary-color (R/G/B, Cy/Mg/Y, etc.) filter.

Moreover, in the third invention, the image generation unit generates a wide dynamic range image by assigning, for each color pixel of the original image, a first composite gradation value obtained by combining the first reference gradation value of itself with the gradation value of a pixel in the corresponding arranged position of the high-sensitivity image as the gradation value of a pixel in the corresponding arranged position of the wide dynamic range image, and by assigning, for each transparent pixel of the original image, a second composite gradation value obtained by combining the second reference gradation value of itself with the gradation value of a pixel in the corresponding arranged position of the high-sensitivity image as the gradation value of a pixel in the corresponding arranged position of the wide dynamic range image (a fourth aspect of the invention).

According to the fourth aspect of the invention, a wide dynamic range image is able to be generated by combining the high-sensitivity gradation values of the high-sensitivity image with the low-sensitivity gradation values of the first reference gradation values and the second reference gradation values.

Furthermore, in the fourth aspect of the invention, the image generation unit calculates the first composite gradation value and the second composite gradation value by performing an addition with weighting by conversion to values in the same range between the first reference gradation value or the second reference gradation value and the gradation value of the high-sensitivity image (a fifth aspect of the invention).

According to the fifth aspect of the invention, the discontinuity between pixels of the wide dynamic range image, which is caused by a difference in sensitivity between the color light-receiving pixels and the transparent light-receiving pixels of the image pickup device, prevents the wide dynamic range image from being unnatural.

Moreover, in the second to fifth aspects of the invention, the image generation unit generates, for each transparent pixel of the original image, a color image by assigning the gradation value of a color calculated based on the gradation values of color pixels existing in the periphery as the gradation value of a pixel in the corresponding arranged position of the color image, and by assigning, for each color pixel of the original image, the gradation value of a color calculated based on the gradation value of itself or the gradation values of other color pixels arranged in the periphery as the gradation value of a pixel in the corresponding arranged position of the color image; and the image processing device includes an object detection unit which performs a first object detection processing for detecting an object from the high-sensitivity image and a second object detection processing for detecting an object from the color image while switching between the first object detection processing and the second object detection processing according to the type of object to be detected (a sixth aspect of the invention).

According to the sixth aspect of the invention, various objects can be detected by performing the first object detection processing using the high-sensitivity image when detecting a low-luminance object (a pedestrian or the like) or by performing the second object detection processing using the color image when detecting an object having color information (a white or yellow line laid on the road, red or green light of a traffic light, etc.).

Moreover, in the fourth or fifth aspects of the invention, the image generation unit generates a color image by assigning, for each transparent pixel of the original image, the gradation value of a color calculated based on the gradation values of color pixels existing in the periphery as the gradation value of a pixel in the corresponding arranged position of the color image, and by assigning, for each color pixel of the original image, the gradation value of a color calculated based on the gradation value of itself or the gradation values of other color pixels arranged in the periphery as the gradation value of a pixel in the corresponding arranged position of the color image; and the image processing device includes an object detection unit which performs a first object detection processing for detecting an object from the high-sensitivity image, a second object detection processing for detecting an object from the color image, and third object detection processing for detecting an object from the wide dynamic range image while switching among the first object detection processing, the second object detection processing, and the third object detection processing according to the type of object to be detected or according to imaging conditions of the camera (a seventh aspect of the invention).

According to the seventh aspect of the invention, various objects can be detected by performing the first object detection processing using the high-sensitivity image when detecting a low-luminance object (a pedestrian or the like), by performing the second object detection processing using the color image when detecting an object having color information (a white or yellow line laid on the road, red or green light of a traffic light, etc.), or by performing the third object detection processing using the wide dynamic range image when detecting an object having a wide range of luminance from low to high luminance levels (a vehicle, a pedestrian, or the like during nighttime).

In the first aspect of the invention, the image generation unit generates the wide dynamic range image by assigning a first composite gradation value obtained by combining the first reference gradation value with the corrected gradation value as the gradation value of the pixel in the corresponding arranged position of the wide dynamic range image, and by calculating, for each transparent pixel, a second reference gradation value of gray based on the gradation values of color pixels arranged in the periphery and assigning a second composite gradation value obtained by combining the second reference gradation value with the gradation value of itself as the gradation value of the pixel in the corresponding arranged position of the wide dynamic range image (an eight aspect of the invention).

According to the eighth aspect of the invention, the image generation unit calculates, for each color pixel, the corrected gradation value with higher sensitivity by using the gradation values of the transparent pixels, and calculates, for each transparent pixel, the second reference gradation value with low sensitivity by using the gradation values of color pixels in the periphery. Then, the image generation unit is able to generate a wide dynamic range image by assigning, for each color pixel, the first composite gradation value obtained by combining the first reference gradation value with the corrected gradation value as the gradation value of the pixel in the corresponding arranged position, and by assigning, for each transparent pixel, the second composite gradation value obtained by combining the second reference gradation value with the gradation value of the transparent pixel as the gradation value of the pixel in the corresponding arranged position.

Furthermore, in the eighth aspect of the invention, the color filter is a three-primary-color filter and the color light-receiving pixel receives light through a filter of one of the three primary colors;

the image generation unit calculates, for each transparent pixel of the original image, the gradation values of the three primary colors on the basis of the gradation values of the color pixels arranged in the periphery, calculates the second reference gradation value from the respective gradation values of the three primary colors, and calculates a gradation difference degree between the gradation value of itself and the second reference gradation value; and the image generation unit calculates, for each color pixel of the original image, the gradation values of the three primary colors on the basis of the gradation value of itself or the gradation values of other color pixels arranged in the periphery, calculates the first reference gradation value from the respective gradation values of the three primary colors, and calculates the corrected gradation value by correcting the first reference gradation value according to the gradation difference degree of the transparent pixels arranged in the periphery (an ninth aspect of the invention).

According to the ninth aspect of the invention, the wide dynamic range image is able to be generated with suppressing the variation between the corrected gradation value and the gradation value of the transparent pixel by correcting the first reference gradation value according to the gradation difference degree.

Moreover, in the ninth invention, the image generation unit calculates the first composite gradation value by performing an addition with weighting by conversion to values in the same range between the first reference gradation value and the corrected gradation value and calculates the second composite gradation value by performing an addition with weighting by conversion to values in the same range between the second reference gradation value and the gradation value of the transparent pixel (a tenth aspect of the invention).

According to the tenth aspect of the invention, the discontinuity between pixels of the wide dynamic range image, which is caused by a difference in sensitivity between the color light-receiving pixels and the transparent light-receiving pixels of the image pickup device, prevents the wide dynamic range image from being unnatural.

Moreover, in any one of the eighth to tenth aspects of the invention, the image generation unit generates a color image by assigning, for each transparent pixel of the original image, the gradation value of a color calculated based on the gradation values of color pixels existing in the periphery as the gradation value of a pixel in the corresponding arranged position of the color image, and by assigning, for each color pixel of the original image, the gradation value of a color calculated based on the gradation value of itself or the gradation values of other color pixels arranged in the periphery as the gradation value of a pixel in the corresponding arranged position of the color image; and the image processing device includes an object detection unit which performs second object detection processing for detecting an object from the color image and third object detection processing for detecting an object from the wide dynamic range image while switching between the second object detection processing and the third object detection processing according to the type of object to be detected or according to the imaging conditions of the camera (a eleventh aspect of the invention).

According to the eleventh aspect of the invention, various objects can be detected by performing the second object detection processing using the color image when detecting an object having color information (a white or yellow line laid on the road, red or green light of a traffic light, etc.) or by performing the third object detection processing using the wide dynamic range image when detecting an object having a wide range of luminance from low to high luminance levels (a vehicle, a pedestrian, or the like during nighttime).

BRIEF DESCRIPTION OF THE DRAWINGS

FIG. 2A and FIG. 2B are explanatory diagrams of images taken by a filter of an image pickup device and a camera.

FIG. 4A and FIG. 4B are explanatory diagrams of a color image and a high-sensitivity image.

FIG. 5 is an explanatory diagram of a wide dynamic range image.

FIG. 6A and FIG. 6B are explanatory diagrams of images taken by a filter of an image pickup device and a camera according to another embodiment.

MODE FOR CARRYING OUT THE INVENTION

Figure 1:
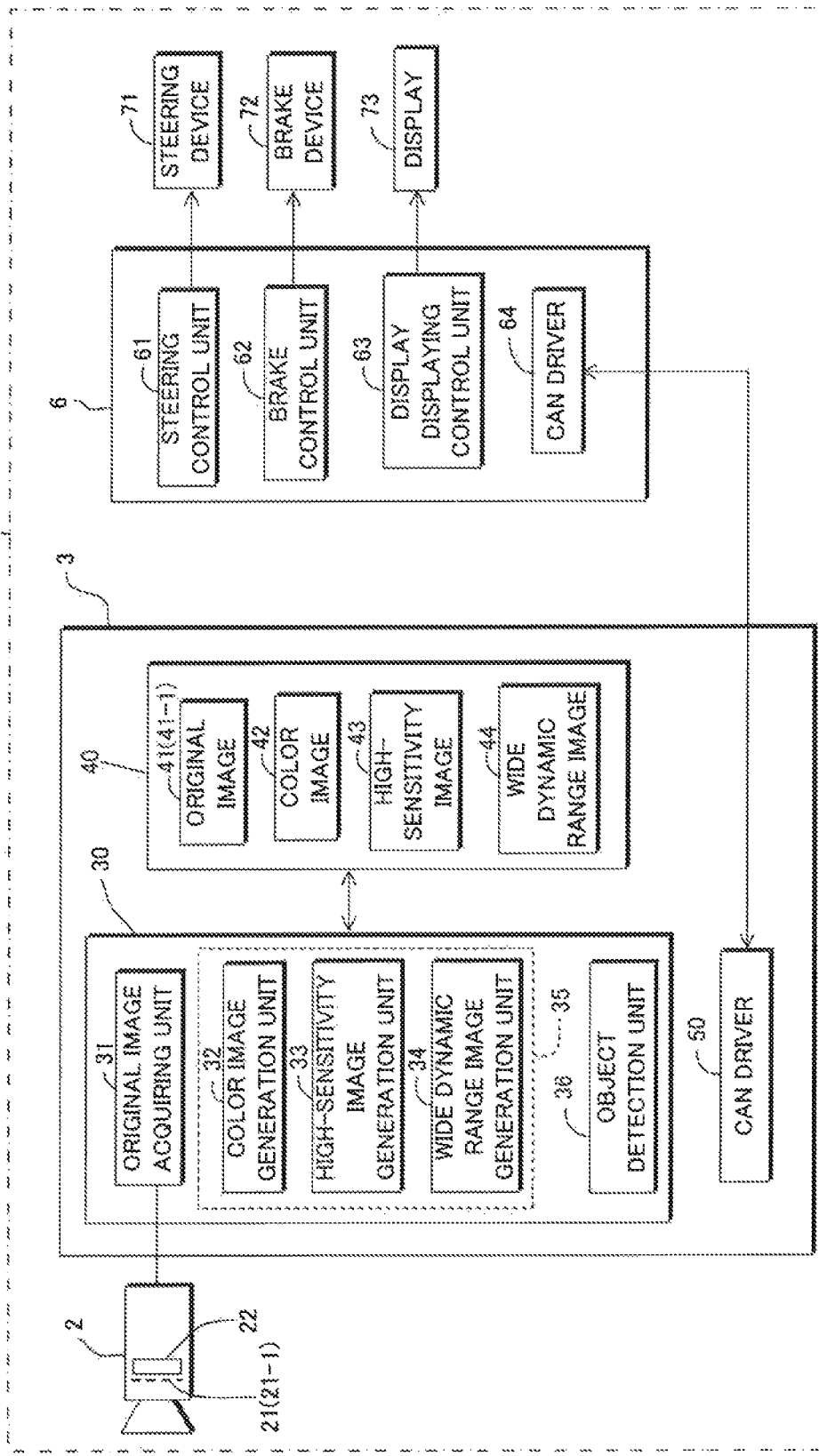
FIG. 1 is a block diagram of an image processing device.

An embodiment of an image processing device of the present invention will be described with reference to FIGS. 1 to 6. With reference to FIG. 1, the image processing device according to this embodiment includes a camera 2 mounted on a vehicle 1 and an image controller 3 connected to the camera 2.

The camera 2 takes an image of a surrounding area of the vehicle 1 by using an image pickup device 22 (CCD, CMOS, etc.) in which a filter 21 is incorporated and outputs imaging data to a control circuit 30. The image pickup device 22 is configured by arranging a plurality of light-receiving elements of (m×n) in a matrix in a plane.

With reference to FIG. 2A, the filter 21 is attached with any one of the color filters of three primary colors R (red), G (green), and B (blue) arranged in the light receiving path of each of the light-receiving, pixels of (m×n) of the image pickup device 22. As the color filters, some other type of color filters other than RGB (such as complementary color filters CyMgY) may be used.

Then, the camera 2 outputs data on gradation values as imaging data to the image controller 3. The gradation value depends on a received, light level per predetermined time period of a R light-receiving pixel (represented by $R_{11}$, $R_{15}$, . . . in the figure and corresponding to a color light-receiving pixel of the present invention) on which an R filter is mounted, a G light-receiving pixel (represented by $G_{12}$, $G_{14}$, . . . in the figure and corresponding to a color light-receiving pixel of the present invention) on which a G filter is mounted, a B light-receiving pixel (represented by $B_{13}$, $B_{31}$, . . . in the figure and corresponding to a color light-receiving pixel of the present invention) on which a B filter is mounted, and a. W light-receiving pixel (represented by $W_{22}$, $W_{24}$, . . . in the figure and corresponding to a transparent light-receiving pixel of the present invention) on which the filter 21 is not mounted.

The image controller 3 has a control circuit 30 including a CPU, a memory, an input-output circuit, and the like, which are not illustrated, an image memory 40, and a CAN (controller area network) driver 50.

The control circuit 30 functions as an original image acquiring unit 31, an image generation unit 35, which includes a color image generation unit 32, a high-sensitivity image generation unit 33, and a wide dynamic range image generation unit 34, and an object detection unit 36 by executing an image processing program stored in the memory by using the CPU. Incidentally, a part or all of the original image acquiring unit 31, the image generation unit 35, and the object detection unit 36 may be configured by hardware.

The original image acquiring unit 31 outputs a control signal to the camera 2 in order to cause the camera 2 to take an image of a surrounding area of the vehicle 1, acquires data of an original image 41 from imaging data output from the camera 2, and retains the acquired data in the image memory 40.

As illustrated in FIG. 2B, the original image 41 is formed by individually assigning the gradation values of the respective light-receiving pixels (R light-receiving pixels, G light-receiving pixels, B light-receiving pixels, and W light-receiving pixels) of the image pickup device 22 illustrated in FIG. 2A as gradation values of the pixels in the corresponding arranged positions (pixels in the same arranged positions) In FIG. 2B, the gradation value of each pixel is represented in the form of "S (uppercase)+one of lowercase characters r, b, and w+i,j (i=1, 2, . . . , m, j=1, 2, . . . , n)."

Here, r represents a gradation value of a pixel (hereinafter referred to as "R pixel." it corresponds to a color pixel of the present invention) in the arranged position corresponding to the R light-receiving pixel in FIG. 2A, g represents a gradation value of a pixel (hereinafter, referred to as "G pixel." It corresponds to a color pixel of the present invention) in the arranged position corresponding to the G light-receiving pixel in FIG. 2A, b represents a gradation value of a pixel (hereinafter, referred to as "B pixel." It corresponds to a color pixel of the present invention) in the arranged position corresponding to the B light-receiving pixel in FIG. 2A, and w represents a gradation value of a pixel (hereinafter, referred to as "W pixel." it corresponds to a transparent pixel of the present invention) in the arranged position corresponding to the W light-receiving pixel in FIG. 2A.

The color image generation unit 32 in the image generation unit 35 generates a color image 42 from the original image 41 and retains the data of the color image 42 in the image memory 40. The high-sensitivity image generation unit 33 generates a high sensitivity image 43 from the original image 41 and the color image 42 and retains the data of the high-sensitivity image 43 in the image memory 40. The wide dynamic range image generation unit 34 generates a wide dynamic range image 44 from the color image 42 and the high-sensitivity image 43 and retains the data of the wide dynamic range image 44 in the image memory 40. The details of the generation processing of the color image 42, the high-sensitivity image 43, and the wide dynamic range image 44 will be described later.

The object detection unit 36 detects as lane mark laid on a road where the vehicle 1 is traveling, other vehicles, as traffic light, a pedestrian, and the like by using the color image 42, the high-sensitivity image 43, and the wide dynamic range image 44 and transmits various control signals to the vehicle controller 6 according to the detection result.

The vehicle controller 6 is an electronic circuit unit which includes a CPU, a memory, an input-output circuit, and the like, which are not illustrated, and functions as a steering control unit 61 which controls the operation of as steering device 71, a brake control unit 62 which controls the operation of a brake device 72, and a display displaying control unit 63 which controls the display of a display 73 by executing a control program of the vehicle 1 retained in the memory by using CPU. The image controller 3 and the vehicle controller 6 communicate with each other via CAN drivers 50 and 64.

Figure 3:
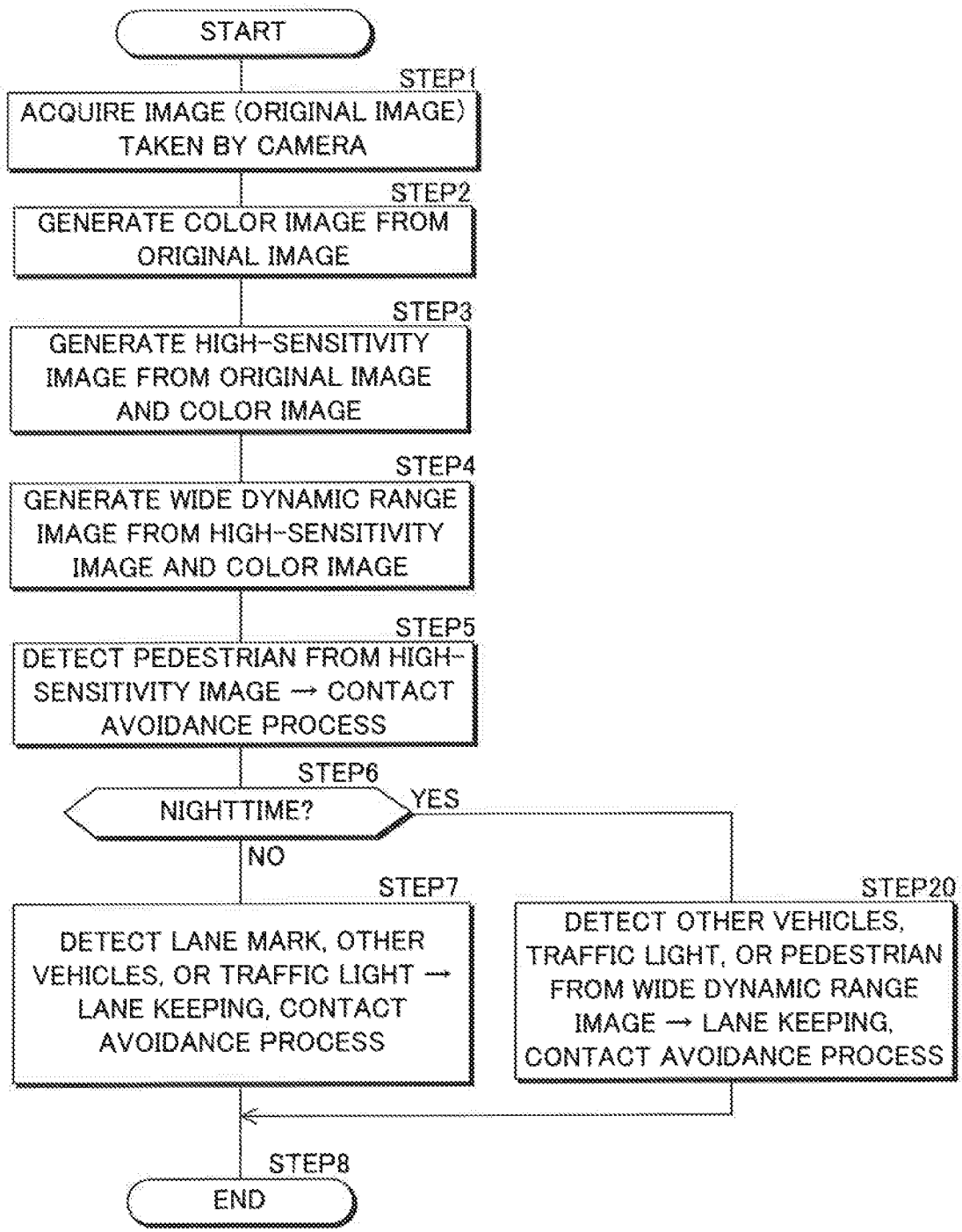
FIG. 3 is an operation flowchart of the image processing device.

The following describes the generation of various images using the control circuit 30 and processing of detecting an object from an image with reference to the flowchart illustrated in FIG. 3.

STEP 1 in FIG. 3 is a process of the original image acquiring unit 31. The original image acquiring unit 31 acquires the original image 41 (see FIG. 2B) from imaging data output from the camera 2 and retains the original image 41 in the image memory 40.

1. Generation Process of Color Image

The subsequent STEP 2 is a process performed by the color image generation unit 32. The color image generation unit 32 generates the color image 42 illustrated in FIG. 4(a) on the basis of the gradation values of the pixels of the original image 41. In the color image of FIG. 4(a), the gradation value of each pixel is represented by $C_{i,j}$ (i=1, 2 . . . , m, j=1, 2, . . . , n).

As described below, $C_{i,j}$ has three elements of a gradation value such as an R value ($C_{i,j}$r: the gradation value of R), a G value ($C_{i,j}$g: the gradation value of G), and a B value ($C_{i,j}$b: the gradation value of B).

$$C_{i,j}=\{C_{i,j}r, C_{i,j}g, C_{i,j}b\}$$

[1-1. Assignment of G Value to $C_{i,j}$t]

The color image generation unit 32 calculates a G value ($C_{i,j}$g) to be assigned to each pixel ($C_{i,j}$) of the color image 42, first. With respect to the G pixel (the pixel having a gradation value $Sg_{i,j}$) of the original image 41, the gradation value of itself is determined to be the G value of a pixel in the corresponding arranged position (a pixel in the same arranged position) of the color image 42. For example, the color image generation unit 32 determines the gradation value ($Sg_{23}$) of the pixel of (i, j)=(2, 3) of the original image 41 to be the G value ($C_{2,3}$g) of the pixel of (i, j)=(2, 3) of the color image 42.

In addition, with respect to an R pixel (a pixel having a gradation value $Sr_{i,j}$), a B pixel (a pixel having a gradation value $Sb_{i,j}$), and a W pixel (a pixel having a gradation value $Sw_{i,j}$) of the original image 41, pixels vertically and horizontally adjacent to the R, B, or W pixel are G pixels as illustrated in FIG. 2B. Therefore, the color image generation unit 32 calculates G values ($C_{i,j}$g) to be assigned to the pixels in the corresponding arranged positions of the color image 42, with respect to the gradation values ($Sg_{i-1,j}$, $Sg_{i+1,j}$, $Sg_{i,j-1}$, $Sg_{i,j+1}$) of the G pixels vertically and horizontally adjacent to the target R, B, or W pixel, by using the following equations (1) to (4).

When I1 and J1 obtained by the following equations (1) and (2) are equal to each other (I1=J1), $C_{i,j}$g obtained by one of the following equations (3) and (4) may be used as the G value. The same is true for I2, J2 to I6, and J6 described later.

[Math. 1]

$$I1 = |Sg_{i+1,j} - Sg_{i-1,j}| \quad (1)$$

[Math. 2]

$$J1 = |Sg_{i,j+1} - Sg_{i,j-1}| \quad (2)$$

[Math. 3]

$$C_{i,j}g = \frac{Sg_{i+1,j} + Sg_{i-1,j}}{2} \text{ (when } I1 < J1) \quad (3)$$

[Math. 4]

$$C_{i,j}g = \frac{Sg_{i,j+1} + Sg_{i,j-1}}{2} \text{ (when } I1 > J1) \quad (4)$$

[1-2. Assignment of R Value to $C_{i,j}$]

Subsequently, the color image generation unit 32 calculates an R value ($C_{i,j}r$) assigned to each pixel ($C_{i,j}$) of the color image 42. With respect to the R pixel (the pixel having a gradation value $Sr_{i,j}$) of the original image 41, the R value ($Sr_{i,j}$) of itself is determined to be the R value ($C_{i,j}r$) of a pixel in the corresponding position of the color image 42. For example, the color image generation unit 32 determines the gradation value ($Sr_{3,3}$) of the pixel of (i, j)=(3, 3) of the original image 41 to be the R value ($C_{3,3}r$) of the pixel of (i, j)=(3, 3) of the color image 42.

Moreover, with respect to a B pixel (a pixel having a gradation value $Sb_{i,j}$) of the original image 41, the second vertically and horizontally adjacent pixels are R pixels as illustrated in FIG. 2B. Therefore, the color image generation unit 32 calculates R values ($C_{i,j}r$) to be assigned to the pixels in the corresponding arranged positions of the color image 42, with respect to the target B pixel, by using the following equations (5) to (8).

[Math. 5]

$$I2 = |Sr_{i+2,j} - Sr_{i-2,j}| \quad (5)$$

[Math. 6]

$$J2 = |Sr_{i,j+2} - Sr_{i,j-2}| \quad (6)$$

[Math. 7]

$$C_{i,j}r = \frac{Sr_{i+2,j} + Sr_{i-2,j}}{2} \text{ (when } I2 < J2) \quad (7)$$

[Math. 8]

$$C_{i,j}r = \frac{Sr_{i,j+2} + Sr_{i,j-2}}{2} \text{ (when } I2 > J2) \quad (8)$$

Moreover, with respect to a W pixel (a pixel having a gradation value $Sw_{i,j}$) of the original image 41, R pixels are arranged in the diagonally upward right position and the diagonally downward left position or in the diagonally upward left position and the diagonally downward right position as illustrated in FIG. 2B. Therefore, the color image generation unit 32 calculates R values ($C_{i,j}r$) to be assigned to the pixels in the corresponding arranged positions of the color image 42, with respect to the target W pixel of the original image 41, by using the following equations (9) and (10).

[Math. 9]

$$C_{i,j}r = \frac{Sr_{i-1,j+1} + Sr_{i+1,j-1}}{2} \quad (9)$$

(when R pixels are arranged in diagonally upward right position and diagonally downward left position)

[Math. 10]

$$C_{i,j}r = \frac{Sr_{i-1,j-1} + Sr_{i+1,j+1}}{2} \quad (10)$$

(when R pixels are arranged in diagonally upward left position and diagonally downward right position)

Moreover, with respect to a G pixel of the original image 41, an R pixel is arranged in one of the pixels vertically and horizontally adjacent to the G pixel as illustrated in FIG. 2B. Therefore, the color image generation unit 32 calculates R values ($C_{i,j}r$) to be assigned to the pixels in the corresponding arranged positions of the color image 42, with respect to the target G pixel of the original image 41, by using the following equations (11) and (14).

[Math. 11]

$$C_{i,j}r = Sr_{i+1,j} \text{ (when } R \text{ pixel is arranged on lower side)} \quad (11)$$

[Math. 12]

$$C_{i,j}r = Sr_{i-1,j} \text{ (when } R \text{ pixel is arranged on upper side)} \quad (12)$$

[Math. 13]

$$C_{i,j}r = Sr_{i,j+1} \text{ (when } R \text{ pixel is arranged on right side)} \quad (13)$$

[Math. 14]

$$C_{i,j}r = Sr_{i,j-1} \text{ (when } R \text{ pixel is arranged on left side)} \quad (14)$$

[1-3. Assignment of B Value to $C_{i,j}$]

Subsequently, the color image generation unit 32 calculates a B value ($C_{i,j}b$) assigned to each pixel of the color image 42. With respect to the B pixel (the pixel having a gradation value $Sb_{i,j}$) of the original image 41, the gradation value of itself is determined to be the B value of a pixel in the corresponding position of the color image 42. For example, the color image generation unit 32 determines the gradation value ($Sb_{3,5}$) of the pixel of (i,j)=(3, 5) of the original image 41 to be the B value ($C_{3,5}b$) of the pixel of (i, j)=(3, 5) of the color image 42.

In addition, with respect to an R pixel of the original image 41, the second vertically and horizontally adjacent pixels are B pixels as illustrated in FIG. 2B. Therefore, the color image generation unit 32 calculates B values ($C_{i,j}b$) to be assigned to the pixels in the corresponding arranged positions of the color image 42, with respect to the target R pixel, by using the following equations (15) to (18).

[Math. 15]

$$I3 = |Sb_{i+2,j} - Sb_{i-2,j}| \quad (15)$$

[Math. 16]

$$J3 = |Sb_{i,j+2} - Sb_{i,j-2}| \quad (16)$$

[Math. 17]

$$C_{i,j}b = \frac{Sb_{i+2,j} + Sb_{i-2,j}}{2} \text{ (when } I3 < J3) \quad (17)$$

-continued

[Math. 18]

$$C_{i,j}b = \frac{Sb_{i,j+2} + Sb_{i,j-2}}{2} \quad \text{(when } I3 > J3\text{)} \tag{18}$$

Moreover, with respect to a W pixel (a pixel having a gradation value $Sw_{i,j}$), B pixels are arranged in the diagonally upward right position and the diagonally downward left position or in the diagonally upward left position and the diagonally downward right position as illustrated in FIG. 2B. Therefore, the color image generation unit 32 calculates B values ($C_{i,j}b$) to be assigned to the pixels in the corresponding arranged positions of the color image 42, with respect to the target W pixel, by using the following equations (19) and (20).

[Math. 19]

$$C_{i,j}b = \frac{Sb_{i-1,j+1} + Sb_{i+1,j-1}}{2} \tag{19}$$

(when B pixels are arranged in diagonally upward right position and diagonally downward left position)

[Math. 20]

$$C_{i,j}b = \frac{Sb_{i-1,j-1} + Sb_{i+1,j+1}}{2} \tag{20}$$

(when B pixels are arranged in diagonally upward left position and diagonally downward right position)

Moreover, with respect to a G pixel (a pixel having a gradation value $Sg_{i,j}$), a B pixel is arranged in one of the pixels vertically and horizontally adjacent to the G pixel as illustrated in FIG. 2B. Therefore, the color image generation unit 32 calculates B values ($C_{i,j}b$) to be assigned to the pixels in the corresponding arranged positions of the color image 42, with respect to the target G pixel, by using the following equations (21) to (24).

[Math. 21]

$$C_{i,j}b = Sb_{i+1,j} \quad \text{(when B pixel is arranged on lower side)} \tag{21}$$

[Math. 22]

$$C_{i,j}b = Sb_{i-1,j} \quad \text{(when B pixel is arranged on upper side)} \tag{22}$$

[Math. 23]

$$C_{i,j}b = Sb_{i,j+1} \quad \text{(when B pixel is arranged on right side)} \tag{23}$$

[Math. 24]

$$C_{i,j}b = Sb_{i,j-1} \quad \text{(when B pixel is arranged on left side)} \tag{24}$$

Through the above process, the color image generation unit 32 calculates the R value ($C_{i,j}r$), the G value ($C_{i,j}g$), and the B value ($C_{i,j}b$) assigned to the respective pixels of the color image 42 and generates the color image 42.

2. Generation Process of High-Sensitivity Image

The subsequent STEP 3 is a process performed by the high-sensitivity image generation unit. The high-sensitivity image generation unit 33 calculates a gradation value ($H_{i,j}$) to be assigned to each pixel of the high-sensitivity image 43 by using the gradation value ($Sw_{i,j}$) of the W pixel of the original image 41 and R, G, and B values of the pixels of the color image 42.

The high-sensitivity image generation unit 33 calculates a reference gradation value $Y_{i,j}$ of gray with respect to each pixel of the color image 42, first, by using an equation (25) described below. With respect to the pixels of the color image 42 corresponding to the R, G, and B pixels of the original image 41, the reference gradation value calculated by the equation (25) described below corresponds to a first reference gradation value of the present invention. Moreover, with respect to the pixel of the color image 42 corresponding to the W pixel of the original image 41, the reference gradation value calculated by the equation (25) described below corresponds to a second reference gradation value of the present invention.

[Math. 25]

$$Y_{i,j} = 0.3 \times C_{i,j}r + 0.59 \times C_{i,j}g + 0.11 \times C_{i,j}b \tag{25}$$

In the above, $Y_{i,j}$ is a reference gradation value, $C_{i,j}r$ is an R value of each pixel $C_{i,j}$ of the color image 42, $C_{i,j}g$ is a G value of each pixel $C_{i,j}$ of the color image 42, $C_{i,j}b$ is a B value of each pixel $C_{i,j}$ of the color image 42, and 0.3, 0.59, and 0.11 are weighting coefficients (determined by an experiment or the like, though any other value may be used).

Thereafter, the high-sensitivity image generation unit 33 calculates a ratio $a_{i,j}$ between the gradation value $Sw_{i,j}$ of each W pixel of the original image 41 and a reference gradation value $Y_{i,j}$ of the pixel of the color image 42 in the arranged position corresponding to each W pixel as a sensitivity difference correction coefficient by using an equation (26) described below. The sensitivity difference correction coefficient $a_{i,j}$ corresponds to a gradation difference degree of the present invention.

[Math. 26]

$$a_{i,j} = \frac{Sw_{i,j}}{Y_{i,j}} \tag{26}$$

[2-1. Assignment of Gradation Value $H_{i,j}$ Corresponding to W Pixel]

The high-sensitivity image generation unit 33 assigns the gradation value ($Sw_{i,j}$) of a W pixel of the original image 41 to the gradation value ($H_{i,j}$) of a pixel in the corresponding arranged position of the high-sensitivity image 43.

[2-2. Assignment of Gradation Value $H_{i,j}$ Corresponding to G Pixel]

In the original image 41 illustrated in FIG. 2B, W pixels are arranged in the positions horizontally or vertically adjacent to a G pixel. Therefore, the high-sensitivity image generation unit 33 calculates a gradation value ($H_{i,j}$) assigned to the pixel of the high-sensitivity image 43 in the arranged position corresponding to the G pixel of the original image 41 by using equations (27) and (28) described below. The gradation value ($H_{i,j}$) calculated using the following equations (27) and (28) corresponds to a corrected gradation value of the present invention.

[Math. 27]

$$H_{i,j} = \frac{a_{i+1,j} + a_{i-1,j}}{2} \times Y_{i,j} \tag{27}$$

(when W pixels are arranged in vertically adjacent positions)

[Math. 28]

$$H_{i,j} = \frac{a_{i,j+1} + a_{i,j-1}}{2} \times Y_{i,j} \tag{28}$$

(when W pixels are arranged in horizontally adjacent positions)

[2-3. Assignment of Gradation Value $H_{i,j}$ Corresponding to R and B Pixels]

In the original image 41 illustrated in FIG. 2B, W pixels are arranged diagonally upward and downward of the R pixel and the B pixel. Therefore, the high-sensitivity image generation unit 33 calculates gradation values ($H_{i,j}$) assigned to the pixels of the high-sensitivity image 43 in the positions corresponding to the R and B pixels of the original image 41 by using the following equation (29). The gradation value ($H_{i,j}$) calculated by the following equation (29) corresponds to a corrected gradation value of the present invention.

[Math. 29]

$$H_{i,j} = \frac{a_{i+1,j+1} + a_{i+1,j-1} + a_{i-1,j+1} + a_{i-1,j-1}}{4} \times Y_{i,j} \qquad (29)$$

Through the above process, the high-sensitivity image generation unit 33 is able to generate a high-sensitivity image 43 in which gradation values ($H_{i,j}$) are assigned to the pixels corresponding to the respective pixels of the original image 41, as illustrated in FIG. 4(b).

3. Generation Process of Wide Dynamic Range Image

The subsequent STEP 4 is a process performed by the wide dynamic range image generation unit 34. The wide dynamic range image generation unit 34 calculates a gradation value ($D_{i,j}$) assigned to each pixel of a wide dynamic range image 44 by performing addition using a weighting function of the following equation (30) between the pixels of the color image 42 and the pixels of the high-sensitivity image 43 in the corresponding arranged positions (the pixels in the same arranged positions).

[Math. 30]

$$w(x) = \frac{1}{1 + e^{g(0.5-x)}} \qquad (30)$$

In the above, w(x) is a sigmoid function and g is a gain. Incidentally, the above equation (30) is an example of the weighting function and other weighting functions may be used.

The wide dynamic range image generation unit 34 calculates a normalized composite gradation value ($hdr_{i,j}$) by using an equation (31) described below on the basis of a normalized gradation value ($h_{i,j}$) obtained by normalizing the gradation value ($H_{i,j}$) of the high-sensitivity image 43 relative to the maximum gradation value (255 for 8-bit resolution or 1023 for 10-bit resolution) and a normalized gradation value ($y_{i,j}$) obtained by normalizing a reference gradation value ($Y_{i,j}$) calculated by the above equation (25) from the color image 42 relative to the maximum gradation value.

The terms "normalizing a gradation value relative to the maximum gradation value" means that the gradation value is divided by the maximum gradation value. For example, if $H_{i,j}$=200 and $Y_{i,j}$=65 and the maximum gradation value is 255, $h_{i,j}$=200/255 and $y_{i,j}$=65/255. Normalization converts the gradation value ($H_{i,j}$) of the high-sensitivity image 43 and the reference gradation value ($Y_{i,j}$) to values in the same range.

[Math. 31]

$$hdr_{i,j} = \frac{(1 - w(h_{i,j})) \times h_{i,j} + w(h_{i,j}) \times a' \times y_{i,j}}{a'} \qquad (31)$$

In the above, $h_{i,j}$ and $y_{i,j}$ are normalized gradation values and a' is a sensitivity difference correction coefficient $a_{i,j}$ of the pixel calculated by the aforementioned equation (26) if the target is a pixel corresponding to a W pixel or a sensitivity difference correction coefficient $a_{i,j}$ of the pixel corresponding to the W pixel arranged in the periphery if the target is a pixel corresponding to R, G, or B.

Furthermore, in order to maintain the low gradation contrast, γ conversion processing is performed for the normalized composite gradation value ($hdr_{i,j}$) by using an equation (32) described below. A gradation value ($D_{i,j}$) which is obtained by combining a first reference gradation value with a corrected gradation value according to the equation (32) corresponds to a first composite gradation value of the present invention. In addition, a gradation value ($D_{i,j}$) which is obtained by combining a second reference gradation value with a gradation value of a transparent pixel according to the equation (32) corresponds to a second composite gradation value of the present invention.

[Math. 32]

$$D_{i,j} = Mb \times (hdr_{i,j})^{\frac{1}{\gamma}} \qquad (32)$$

In the above, $D_{i,j}$ is a gradation value of a wide dynamic range image and Mb is the maximum gradation value.

Through the above process, the wide dynamic range image generation unit 34 is able to generate a wide dynamic range image 44 in which a gradation value ($D_{i,j}$) is assigned to the pixel corresponding to each pixel of the original image 41 as illustrated in FIG. 5.

4. Object Detection Processing

Subsequent STEP 5 to STEP 7 and STEP 20 are processes performed by the object detection unit 36. The object detection unit 36 switches among a process of detecting an object from the color image 42 (corresponding to a second object detection process of the present invention), a process of detecting an object from the high-sensitivity image 43 (corresponding to a first object detection process of the present invention), and a process of detecting an object from the wide dynamic range image 44 (corresponding to a third object detection process of the present invention) according to the type of the detected object or the imaging conditions of the camera 2.

[4-1. Object Detection by High-Sensitivity Image]

The object detection unit 36 detects a pedestrian from the high-sensitivity image 43 in STEP 5. The pedestrian is often of low luminance. Therefore, a pedestrian existing around the vehicle 1 is able to be detected with precision by using the high-sensitivity image 43. The process of detecting an object from the high-sensitivity image 43 in STEP 5 corresponds to a first object detection process of the present invention.

The object detection unit 36 determines whether a pedestrian is likely to come in contact with the vehicle 1 at the time of detecting the pedestrian. If determining that the pedestrian is likely to come in contact with the vehicle 1, the object detection unit 36 transmits a control signal for giving an instruction to take a contact avoidance action to the vehicle controller 6.

In response to receiving the control signal, the display displaying control unit 63 of the vehicle controller 6 displays an alarm on the display 73. Moreover, the brake control unit 62 activates the brake device 72 to perform a contact avoidance process, if necessary.

In the next STEP 6, the object detection unit 36 determines whether it is night. Whether it is night is determined from, for example, a state of whether headlights (not illustrated) mounted on the vehicle 1 are on or off. Alternatively, the vehicle 1 may be provided with an illumination sensor to determine whether it is night from illuminance detected by the illuminance sensor.

[4-2. Object Detection Using Wide Dynamic Range Image]

If the object detection unit 36 determines that it is night, the control branches to STEP 20, in which the object detection unit 36 detects other vehicles and pedestrians from the wide dynamic range image 44. Note here that it is necessary to detect objects of a wide range of luminance levels from dark to light objects during nighttime.

The dark objects include any other remote vehicle outside the region illuminated by the headlights of the vehicle 1, an interrupt vehicle, a suddenly appearing vehicle, a pedestrian on a sidewalk outside the region illuminated by the headlights of the vehicle 1, a pedestrian crossing the road, and the like. Moreover, the light objects include the tail lights and stop lights of a preceding vehicle, the headlights of an oncoming vehicle, a pedestrian illuminated by the headlights of the vehicle 1, and the like.

Therefore, during nighttime, other vehicles and pedestrians can be detected by using the wide dynamic range image 44. The process of detecting an object from the wide dynamic range image 44 in STEP 20 corresponds to a third object detection process of the present invention.

When detecting a pedestrian or another vehicle likely to come in contact with the vehicle, the object detection unit 36 transmits a control signal for giving an instruction to take a contact avoidance action to the vehicle controller 6 as described above. Moreover, when detecting a traffic light, the object detection unit 36 transmits a control signal for giving an instruction to brake the vehicle 1 to the vehicle controller 6, if needed. In response to receiving the control signal, the brake control unit 62 activates the brake device 72 to brake the vehicle 1.

[4-3. Object Detection Using Color Image]

Unless it is night in STEP 6, the control proceeds to STEP 7, where the object detection unit 36 detects a lane mark on a road, other vehicles, and a traffic light from the color image 42. Note here that, if the sky illuminance of daytime is sufficiently high, high sensitivity is unnecessary to detect a lane mark, other vehicles, and a traffic light, but color information needs to be acquired with high contrast.

Therefore, the object detection unit 36 detects a lane mark, other vehicles, and a traffic light from the color image 42. At that time, the object detection unit 36 determines the attributes of the lane mark from the color of the lane mark (white line, yellow line, etc.). Moreover, the object detection unit 36 determines the deceleration of a preceding vehicle from the brake lights of the preceding vehicle to determine whether the vehicle is likely to rear-end the preceding vehicle. The process of detecting an object from the color image 42 in STEP 7 corresponds to a second object detection process of the present invention.

Then, the object detection unit 36 transmits a control signal for lane keeping control for keeping the vehicle 1 within a traveling lane from the detected position of the lane mark to the vehicle controller 6. In response to receiving the control signal, the steering control unit 61 controls the operation of the steering device 71.

Moreover, when detecting another vehicle likely to come in contact with the vehicle, the object detection unit 36 transmits a signal for giving an instruction to take a contact avoidance action to the vehicle controller 6 as described above. Furthermore, when detecting red light of a traffic light ahead, the object detection unit 36 transmits an alarm signal to the vehicle controller 6 in the case where the driver did not perform a braking operation. In response to receiving the alarm signal, the display displaying control unit 63 displays an alarm on the display. In addition, the brake control unit 62 activates the brake device 72 to brakes the vehicle 1, if needed.

5. Generation Process of Color Image in the Case of Using Another Type of Filter With reference to FIG. 6, the following describes the generation process of the color image 42, the high-sensitivity image 43, and the wide dynamic range image 44 in the case of a different RGBW arrangement of the filter 21.

In the case of using a filter 21-1 with RGBW arrangement as illustrated in FIG. 6A, an original image 41-1 taken by the camera 2 is as illustrated in FIG. 6B. In FIG. 6B, the gradation value of each pixel is represented by $S(r, g, b, w)_{i,j}$ in the same manner as in FIG. 2B.

[5-1. Assignment of G Value to $C_{i,j}$]

The color image generation unit 32 calculates a G value ($C_{i,j}$g) to be assigned to each pixel ($C_{i,j}$) of the color image 42, first. With respect to the G pixel (the pixel having a gradation value $Sg_{i,j}$) of the original image 41-1, the gradation value of itself is determined to be the G value of a pixel in the corresponding arranged position (a pixel in the same arranged position) of the color image 42. For example, the color image generation unit 32 determines the gradation value ($Sg_{2,2}$) of the pixel of $(i, j)=(2, 2)$ of the original image 41-1 to be the G value ($C_{2,2}$g) of the pixel of $(i, j)=(2, 2)$ of the color image 42.

In addition, with respect to an R pixel (a pixel having a gradation value $Sr_{i,j}$) and a B pixel (a pixel having a gradation value $Sb_{i,j}$) of the original image 41-1, pixels diagonally adjacent to the R or B pixel are G pixels as illustrated in FIG. 6B. Therefore, the color image generation unit 32 calculates G values ($C_{i,j}$g) to be assigned to the pixels in the corresponding positions of the color image 42, with respect to the gradation values ($Sg_{i+1,j+1}, Sg_{i-1,j-1}, Sg_{i-1,j+1}, Sg_{i+1,j-1}$) of the G pixels diagonally adjacent to the target R or B pixel, by using the following equations (33) to (36).

[Math. 33]
$$I3 = |Sg_{i+1,j+1} - Sg_{i-1,j-1}| \tag{33}$$

[Math. 34]
$$J3 = |Sg_{i-1,j+1} - Sg_{i+1,j-1}| \tag{34}$$

[Math. 35]
$$C_{i,j}g = \frac{Sg_{i+1,j+1} + Sg_{i-1,j-1}}{2} \text{ (when } I3 < J3\text{)} \tag{35}$$

[Math. 36]
$$C_{i,j}g = \frac{Sg_{i-1,j+1} + Sg_{i+1,j-1}}{2} \text{ (when } I3 > J3\text{)} \tag{36}$$

Moreover, with respect to a W pixel (a pixel having a gradation value $Sw_{i,j}$) of the original image 41-1, pixels vertically or horizontally adjacent to the W pixel are G pixels as illustrated in FIG. 6B. Therefore, the color image generation unit 32 calculates G values ($C_{i,j}g$) to be assigned to the pixels in the corresponding arranged positions of the color image 42, with respect to the gradation values ($Sg_{i-1,j}$, $Sg_{i+1,j}$, $Sg_{i,j-1}$, $Sg_{i,j+1}$) of the G pixels vertically or horizontally adjacent to the target W pixel, by using the following equations (37) and (38).

[Math. 37]

$$C_{i,j}g = \frac{Sg_{i+1,j} + Sg_{i-1,j}}{2} \qquad (37)$$

(when G pixels are arranged in vertically adjacent positions)

[Math. 38]

$$C_{i,j}g = \frac{Sg_{i,j+1} + Sg_{i,j-1}}{2} \qquad (38)$$

(when G pixels are arranged in horizontally adjacent positions)

[5-2. Assignment of R Value to $C_{i,j}$]

Subsequently, the color image generation unit 32 calculates an R value ($C_{i,j}r$) assigned to each pixel of the color image 42. With respect to the R pixel (the pixel having a gradation value $Sr_{i,j}$) of the original image 41-1, the gradation value of itself is determined to be the R value of the color image 42. For example, the color image generation unit 32 determines the gradation value ($Sr_{3,3}$) of the pixel of (i, j)=(3, 3) of the original image 41 to be the R value ($C_{3,3}r$) of the pixel of (i, j)=(3, 3) of the color image 42.

In addition, with respect to a B pixel (a pixel having a gradation value $Sb_{i,j}$) of the original image 41-1, W pixels are vertically and horizontally adjacent to the B pixel and the second vertically and horizontally adjacent pixels are R pixels as illustrated in FIG. 6B. Therefore, the color image generation unit 32 calculates R values ($C_{i,j}r$) to be assigned to the pixels in the corresponding arranged positions of the color image 42, with respect to the gradation values ($Sr_{i+2,j}$, $Sr_{i-2,j}$, $Sr_{i,j+2}$, $Sr_{i,j-2}$) of the second vertically and horizontally adjacent R pixels of the target B pixel, by using the following equations (39) to (42).

[Math. 39]

$$I4 = |Sw_{i+1,j} - Sw_{i-1,j}| \qquad (39)$$

[Math. 40]

$$J4 = |Sw_{i,j+1} - Sw_{i,j-1}| \qquad (40)$$

[Math. 41]

$$C_{i,j}r = \frac{Sr_{i+2,j} + Sr_{i-2,j}}{2} \text{ (when } I4 < J4) \qquad (41)$$

[Math. 42]

$$C_{i,j}r = \frac{Sr_{i,j+2} + Sr_{i,j-2}}{2} \text{ (when } I4 > J4) \qquad (42)$$

Moreover, with respect to a G pixel (a pixel having a gradation value $Sg_{i,j}$) of the original image 41-1, R pixels are arranged in the diagonally upward right position and the diagonally downward left position or in the diagonally upward left position and the diagonally downward right position of the G pixel as illustrated in FIG. 6B. Therefore, the color image generation unit 32 calculates R values ($C_{i,j}r$) to be assigned to the pixels in the corresponding arranged positions of the color image 42, with respect to the gradation values ($Sr_{i+1,j+1}$, $Sr_{i-1,j-1}$, $Sr_{i-1,j+1}$, $Sr_{i+1,j-1}$) of the R pixels diagonally adjacent to the target G pixel of the original image 41-1, by using the following equations (43) and (44).

[Math. 43]

$$C_{i,j}r = \frac{Sr_{i+1,j+1} + Sr_{i-1,j-1}}{2} \qquad (43)$$

(R pixels are arranged in diagonally upward left position and diagonally downward right position)

[Math. 44]

$$C_{i,j}r = \frac{Sr_{i-1,j+1} + Sr_{i+1,j-1}}{2} \qquad (44)$$

(R pixels are arranged in diagonally upward right position and diagonally downward left position)

Moreover, with respect to a W pixel (a pixel having a gradation value $Sw_{i,j}$) of the original image 41-1, an R pixel is arranged in one of the pixels vertically and horizontally adjacent to the W pixel. Therefore, the color image generation unit 32 calculates R values ($C_{i,j}r$) to be assigned to the pixels in the corresponding arranged positions of the color image 42, with respect to the target W pixel of the original image 41-1, by using the following equations (45) to (48).

[Math. 45]

$$C_{i,j}r = Sr_{i+1,j} \text{ (when } R \text{ pixel is arranged on lowerside)} \qquad (45)$$

[Math. 46]

$$C_{i,j}r = Sr_{i-1,j} \text{ (when } R \text{ pixel is arranged on upper side)} \qquad (46)$$

[Math. 47]

$$C_{i,j}r = Sr_{i,j+1} \text{ (when } R \text{ pixel is arranged on right side)} \qquad (47)$$

[Math. 48]

$$C_{i,j}r = S_{i,j-1} \text{ (when } R \text{ pixel is arranged on left side)} \qquad (48)$$

[5-3. Assignment of B Value to C]

Subsequently, the color image generation unit 32 calculates a B value ($C_{i,j}b$) assigned to each pixel of the color image 42. With respect to the B pixel (the pixel having a gradation value $Sb_{i,j}$) of the original image 41-1, the gradation value of itself is determined to be a B value of the color image 42. For example, the color image generation unit 32 determines the gradation value ($Sb_{3,5}$) of the pixel of (i, j)=(3, 5) of the original image 41-1 to be the B value ($C_{3,5}b$) of the pixel of (i, j)=(3, 5) of the color image 42.

In addition, with respect to an R pixel (a pixel having a gradation value $Sr_{i,j}$) of the original image 41-1, W pixels are vertically and horizontally adjacent to the R pixel and the second vertically and horizontally adjacent pixels are B pixels as illustrated in FIG. 6B. Therefore, the color image generation unit 32 calculates B values ($C_{i,j}b$) to be assigned to the pixels in the corresponding arranged positions of the color image 42, with respect to the gradation values ($Sb_{i+2,j}$, $Sb_{i-2,j}$, $Sb_{i,j+2}$, $Sb_{i,j-2}$) of the second vertically and horizontally adjacent B pixels of the target R pixel, by using the following equations (49) to (52).

[Math. 49]

$$I5 = |Sw_{i+1,j} - Sw_{i-1,j}| \quad (49)$$

[Math. 50]

$$J5 = |Sw_{i,j+1} - Sg_{i,j-1}| \quad (50)$$

[Math. 51]

$$C_{i,j}b = \frac{Sb_{i+2,j} + Sb_{i-2,j}}{2} \text{ (when } I5 < J5) \quad (51)$$

[Math. 52]

$$C_{i,j}b = \frac{Sb_{i,j+2} + Sb_{i,j-2}}{2} \text{ (when } I5 > J5) \quad (52)$$

Moreover, with respect to a G pixel (a pixel having a gradation value $Sg_{i,j}$) of the original image 41-1, B pixels are arranged in the diagonally upward right position and the diagonally downward left position or in the diagonally upward left position and the diagonally downward right position of the G pixel as illustrated in FIG. 6B. Therefore, the color image generation unit 32 calculates B values ($C_{i,j}b$) to be assigned to the pixels in the corresponding arranged positions of the color image 42, with respect to the gradation values ($Sb_{i+1,j+1}$, $Sb_{i-1,j-1}$, $Sb_{i-1,j+1}$, $Sb_{i+1,j-1}$) of the B pixels diagonally adjacent to the target G pixel of the original image 41-1, by using the following equations (53) and (54).

[Math. 53]

$$C_{i,j}b = \frac{Sb_{i+1,j+1} + Sb_{i-1,j-1}}{2} \quad (53)$$

(B pixels are arranged in diagonally upward left position and diagonally downward right position)

[Math. 54]

$$C_{i,j}b = \frac{Sb_{i-1,j+1} + Sb_{i+1,j-1}}{2} \quad (54)$$

(B pixels are arranged in diagonally upward right position and diagonally downward left position)

Moreover, with respect to a W pixel (a pixel having a gradation value $Sw_{i,j}$) of the original image 41-1, a B pixel is arranged in one of the pixels vertically and horizontally adjacent to the W pixel. Therefore, the color image generation unit 32 calculates B values ($C_{i,j}b$) to be assigned to the pixels in the corresponding arranged positions of the color image 42, with respect to the target W pixel of the original image 41-1, by using the following equations (55) to (58).

[Math. 55]

$$C_{i,j}b = Sb_{i+1,j} \text{ (when } B \text{ pixel is arranged on lower side)} \quad (55)$$

[Math. 56]

$$C_{i,j}b = Sb_{i-1,j} \text{ (when } B \text{ pixel is arranged on upper side)} \quad (56)$$

[Math. 57]

$$C_{i,j}b = Sb_{i,j+1} \text{ (when } B \text{ pixel is arranged on right side)} \quad (57)$$

[Math. 58]

$$C_{i,j}b = Sb_{i,j-1} \text{ (when } B \text{ pixel is arranged on left side)} \quad (58)$$

Through the above process, the color image generation unit 32 calculates the R value ($C_{i,j}r$), the G value ($C_{i,j}g$), and the B value ($C_{i,j}b$) assigned to the respective pixels of the color image 42 from the original image 41-1 and generates the color image 42.

6. Generation Process of High-Sensitivity Image in the Case of Using Another Type of Filter The high-sensitivity image generation unit 33 calculates a gradation value ($H_{i,j}$) to be assigned to each pixel of the high-sensitivity image 43 by using the gradation value ($Sw_{i,j}$) of the W pixel of the original image 41-1 and R, G and B values of the pixels of the color image 42.

The high-sensitivity image generation unit 33 calculates a reference gradation value ($Y_{i,j}$) of gray with respect to each pixel of the color image 42, first, by using an equation (59) described below. With respect to the pixels of the color image 42 corresponding to the R, G, and B pixels of the original image 41-1, the reference gradation value calculated by the equation (59) described below corresponds to the first reference gradation value of the present invention. Moreover, with respect to the pixel of the color image 42 corresponding to the W pixel of the original image 41-1, the reference gradation value calculated by the equation (59) described below corresponds to the second reference gradation value of the present invention.

[Math. 59]

$$Y_{i,j} = 0.3 \times C_{i,j}r + 0.59 \times C_{i,j}g + 0.11 \times C_{i,j}b \quad (59)$$

In the above, $Y_{i,j}$ is a reference gradation value, $C_{i,j}r$ is an R value of each pixel $C_{i,j}$ of the color image 42, $C_{i,j}g$ is a G value of each pixel $C_{i,j}$ of the color image 42, $C_{i,j}b$ is a B value of each pixel $C_{i,j}$ of the color image 42, and 0.3, 0.59, and 0.11 are weighting coefficients (determined by an experiment or the like, though any other value may be used).

Thereafter, the high-sensitivity image generation unit 33 calculates a ratio ($a_{i,j}$) between the gradation value ($Sw_{i,j}$) of each W pixel of the original image 41-1 and a reference gradation value ($Y_{i,j}$) of the pixel of the color image 42 in the arranged position corresponding to each W pixel as a sensitivity difference correction coefficient by using an equation (60) described below. The sensitivity difference correction coefficient $a_{i,j}$ corresponds to a gradation difference degree of the present invention.

[Math. 60]

$$a_{i,j} = \frac{Sw_{i,j}}{Y_{i,j}} \quad (60)$$

[6-1. Assignment of Gradation Value $H_{i,j}$ Corresponding to W Pixel]

The high-sensitivity image generation unit 33 assigns the gradation value ($Sw_{i,j}$) of a W pixel of the original image 41-1 to a gradation value ($H_{i,j}$) of a pixel in the corresponding arranged position of the high-sensitivity image 43.

[6-2. Assignment of Gradation Value $H_{i,j}$ Corresponding to G, R, or B Pixel]

In the original image 41-1 illustrated in FIG. 6B, W pixels are arranged in the positions vertically and horizontally adjacent to each of the G, R, and B pixels. Therefore, the high-sensitivity image generation unit 33 calculates a gradation value ($H_{i,j}$) assigned to the pixel of the high-sensitivity image 43 in the arranged position corresponding to each of the G, R, and pixels of the original image 41-1 by using equations (61) to (64) described below.

[Math. 61]

$$I6 = |a_{i+1,j} - a_{i-1,j}| \quad (61)$$

[Math. 62]

$$J6 = |a_{i,j+1} - a_{i,j-1}| \quad (62)$$

[Math. 63]

$$H_{i,j} = \frac{a_{i+1,j} + a_{i-1,j}}{2} \times Y_{i,j} \text{ (when } I6 < J6) \quad (63)$$

[Math. 64]

$$H_{i,j} = \frac{a_{i,j+1} + a_{i,j-1}}{2} \times Y_{i,j} \text{ (when } I6 > J6) \quad (64)$$

Through the above process, the high-sensitivity image generation unit 33 calculates the gradation value ($H_{i,j}$) assigned to each pixel of the high-sensitivity image 43 from the original image 41-1 and the color image 42 and generates the high-sensitivity image 43.

7. Generation Process of Wide Dynamic Range Image in the Case of Using Another Type of Filter The wide dynamic range image generation unit 34 generates a wide dynamic range image 44 by performing combination processing using a weighting function between the pixels which are the same in the arranged position between the color image 42 and the high-sensitivity image 43 generated from the original image 41-1, similarly to the aforementioned "3. Generation process of wide dynamic range image."

Although there has been described an example in which the image processing device of the present invention is mounted on the vehicle 1 in this embodiment, the present invention is not particularly limited to this embodiment and is applicable to various uses such as a monitoring device and the like.

Furthermore, although two types of filters in FIG. 2B and FIG. 6B are illustrated in this embodiment, the present invention is applicable to the generation of a high-sensitivity image as long as the image is taken by a camera using an image pickup device including an arrangement of pixels for receiving light through a color filter and pixels for receiving light without using a color filter.

Moreover, in this embodiment, a ratio ($a_{i,j}$) between the gradation value ($Sw_{i,j}$) of each W pixel of the original image 41 or 41-1 and the reference gradation value ($Y_{i,j}$) of the pixel of the color image 42 in the arranged position corresponding to each W pixel is calculated as a sensitivity difference correction coefficient by using the aforementioned equations (26) and (60), and a gradation value ($H_{i,j}$) of each pixel of the high-sensitivity image is calculated using the sensitivity difference correction coefficient a by using the aforementioned equations (61) to (64). Each gradation value ($H_{i,j}$) of the high-sensitivity image, however, may be calculated by using any other indicator based on the gradation value ($Sw_{i,j}$) of the W pixel such as a difference between the gradation value ($Sw_{i,j}$) of each W pixel and the reference gradation value ($Y_{i,j}$) as a gradation difference degree of the present invention.

INDUSTRIAL APPLICABILITY

The present invention is applicable to generate a high-sensitivity image, a wide dynamic range image, or the like from an image taken by a camera using an image pickup device including an arrangement of pixels for receiving light through a color filter and pixels for receiving light without using a color filter.

DESCRIPTION OF THE REFERENCE NUMERALS

1 Vehicle
2 Camera
3 Image controller
6 Vehicle controller
21 (21-1) Filter
22 Image pickup device
30 Control circuit
31 Original image acquiring unit
32 Color image generation unit
33 High-sensitivity image generation unit
34 Wide dynamic range image generation unit
35 Image generation unit
36 Object detection unit
41 (41-1) Original image
42 Color image
43 High-sensitivity image
44 Wide dynamic range image

The invention claimed is:
1. An image processing device comprising:
a camera which takes an image using an image pickup device including an arrangement of a plurality of color light-receiving pixels which receive light through a color filter and a plurality of transparent light-receiving pixels which receive light without using a color filter;
a computer, including at least a central processing unit, communicatively coupled to the camera; and
a non-transitory computer readable medium storing instructions for controlling the central processing unit to function as an image generation unit which generates at least one of a high-sensitivity image and a wide dynamic range image based on a corrected gradation value of each of a plurality of color pixels, for an original image taken by the camera, the original image including an arrangement of the plurality of color pixels having gradation values individually assigned according to the received light levels of the respective color light-receiving pixels and a plurality of transparent pixels having gradation values individually assigned according to the received light levels of the respective transparent light-receiving pixels, by calculating, for each of the plurality of color pixels, the corrected gradation value in which a first reference gradation value of gray calculated based on the gradation value of itself or the gradation values of other color pixels arranged in the periphery is corrected according to the gradation values of transparent pixels arranged in the periphery, wherein:
the image generation unit generates the high-sensitivity image by assigning the corrected gradation value of each of the plurality of color pixels and the gradation value of each of the plurality of transparent pixels as gradation values of pixels in a corresponding arranged positions of the high-sensitivity image,
the color filter is a three-primary-color filter and the color light-receiving pixel receives light through a filter of any one of the three primary colors.
the image generation unit calculates, for each transparent pixel of the original image, the gradation values of the three primary colors on the basis of the gradation values of the color pixels arranged in the periphery and calculates a gradation difference degree between a second reference gradation value of gray calculated from the gradation values of the three primary colors and the gradation value of itself, the image generation unit calculates, for each color pixel of the original image, the gradation values of the three primary colors on the basis of the gradation value of itself or the gradation values of other color pixels arranged in the periphery and calculates the first reference gradation value from the gradation values of the three primary colors, and the image generation unit calculates the corrected gradation value by correcting the first reference gradation value on the basis of the gradation difference degree of the transparent pixels arranged in the periphery.

2. The image processing device according to claim 1, wherein the image generation unit generates a wide dynamic range image by assigning, for each color pixel of the original image, a first composite gradation value obtained by combining the first reference gradation value of itself with the gradation value of a pixel. in the corresponding arranged position of the high-sensitivity image as the gradation value of a pixel in the corresponding arranged position of the wide dynamic range image, and by assigning, for each transparent pixel of the original image, a second composite gradation value obtained by combining the second reference gradation value of itself with the gradation value of a pixel in the corresponding arranged position of the high-sensitivity image as the gradation value of a pixel in the corresponding arranged position of the wide dynamic range image.

3. The image processing device according to claim 2, wherein the image generation unit calculates the first composite gradation value and the second composite gradation value by performing an addition with weighting by conversion to values in the same range between the first reference gradation value or the second reference gradation value and the gradation value of the high-sensitivity image.

4. The image processing device according to claim 2, wherein:
the image generation unit generates a color image by assigning, for each transparent pixel of the original image, the gradation value of a color calculated based on the gradation values of color pixels existing in the periphery as the gradation value of a pixel in the corresponding arranged position of the color image, and by assigning, for each color pixel of the original image, the gradation value of a color calculated based on the gradation value of itself or the gradation values of other color pixels arranged in the periphery as the gradation value of a pixel in the corresponding arranged position of the color image; and the image processing device includes an object detection unit which performs a first object detection processing for detecting an object from the high-sensitivity image, a second object detection processing for detecting an object from the color image, and third object detection processing for detecting an object from the wide dynamic range image while switching among the first object detection processing, the second object detection processing, and the third object detection processing according to the type of object to be detected or according to imaging conditions of the camera.

5. The image processing device according to claim 1, wherein:
the image generation unit generates, for each transparent pixel of the original image, a color image by assigning the gradation value of a color calculated based on the gradation values of color pixels existing in the periphery as the gradation value of a pixel in the corresponding arranged position of the color image, and by assigning, for each color pixel of the original image, the gradation value of a color calculated based on the gradation value of itself or the gradation values of other color pixels arranged in the periphery as the gradation value of a pixel in the corresponding arranged position of the color image; and the image processing device includes an object detection unit which performs a first object detection processing for detecting an object from the high-sensitivity image and a second object detection processing for detecting an object from the color image while switching between the first object detection processing and the second object detection processing according to the type of object to be detected.

6. The image processing device according to claim 1, wherein the image generation unit generates the wide dynamic range image by assigning a first composite gradation value obtained by combining the first reference gradation value with the corrected gradation value as the gradation value of the pixel in the corresponding arranged position of the wide dynamic range image, and by calculating, for each transparent pixel, a second reference gradation value of gray based on the gradation values of color pixels arranged in the periphery and assigning a second composite gradation value obtained by combining the second reference gradation value with the gradation value of itself as the gradation value of the pixel in the corresponding arranged position of the wide dynamic range image.

7. The image processing device according to claim 6, wherein:
the color filter is a three-primary-color filter and the color light-receiving pixel receives light through a filter of one of the three primary colors;
the image generation unit calculates, for each transparent pixel of the original image, the gradation values of the three primary colors on the basis of the gradation values of the color pixels arranged in the periphery, calculates the second reference gradation value from the respective gradation values of the three primary colors, and calculates a gradation difference degree between the gradation value of itself and the second reference gradation value; and the image generation unit calculates, for each color pixel of the original image, the gradation values of the three primary colors on the basis of the gradation value of itself or the gradation values of other color pixels arranged in the periphery, calculates the first reference gradation value from the respective gradation values of the three primary colors, and calculates the corrected gradation value by correcting the first reference gradation value according to the gradation difference degree of the transparent pixels arranged in the periphery.

8. The image processing device according to claim 7, wherein the image generation unit calculates the first composite gradation value by performing an addition with weighting by conversion to values in the same range between the first reference gradation value and the corrected gradation value and calculates the second composite gradation value by performing an addition with weighting by conversion to values in the same range between the second reference gradation value and the gradation value of the transparent pixel.

9. The image processing device according to claim 6, wherein:
the image generation unit generates a color image by assigning, for each transparent pixel of the original image, the gradation value of a color calculated based on the gradation values of color pixels existing in the periphery as the gradation value of a pixel in the corresponding arranged position of the color image, and by assigning, for each color pixel of the original image, the gradation value of a color calculated based on the gradation value of itself or the gradation values of other color pixels arranged in the periphery as the gradation value of a pixel in the corresponding arranged position of the color image; and the image processing device includes an object detection unit which performs second object detection processing for detecting an object from the color image and third object detection processing for detecting an object from the wide dynamic range image while switching between the second object detection processing and the third object detection processing according to the type of object to be detected or according to the imaging conditions of the camera.

* * * * *